(12) United States Patent
Kedar

(10) Patent No.: US 9,765,494 B2
(45) Date of Patent: Sep. 19, 2017

(54) MARINE FENDER SYSTEM

(71) Applicant: Sharon Kedar, West Hills, CA (US)

(72) Inventor: Mordechai Kedar, Tel Aviv (IL)

( * ) Notice: Subject to any disclaimer, the term of this patent is extended or adjusted under 35 U.S.C. 154(b) by 0 days.

(21) Appl. No.: 15/159,974

(22) Filed: May 20, 2016

(65) Prior Publication Data

US 2016/0340848 A1    Nov. 24, 2016

Related U.S. Application Data

(60) Provisional application No. 62/164,861, filed on May 21, 2015.

(51) Int. Cl.
*E02B 3/26* (2006.01)

(52) U.S. Cl.
CPC ..................... *E02B 3/26* (2013.01)

(58) Field of Classification Search
CPC .................. B63B 59/02; E02B 3/26
USPC .................. 405/212, 214, 215; 114/219
See application file for complete search history.

(56) References Cited

U.S. PATENT DOCUMENTS

| | | | | |
|---|---|---|---|---|
| 2,655,005 A * | 10/1953 | Kinneman | ................. | E02B 3/26 114/219 |
| 3,533,242 A * | 10/1970 | Narabu | ..................... | E02B 3/26 114/219 |
| 3,677,017 A * | 7/1972 | Shirvany | ................... | E02B 3/26 267/140 |
| 3,763,653 A * | 10/1973 | Shirvany | ................... | E02B 3/26 405/215 |
| 3,803,853 A * | 4/1974 | Kuus | ......................... | E02B 3/26 114/219 |
| 3,853,084 A * | 12/1974 | Kedar | ....................... | E02B 3/26 114/219 |
| 3,890,916 A * | 6/1975 | Tummers | .................. | E02B 3/26 114/219 |

(Continued)

FOREIGN PATENT DOCUMENTS

| | | |
|---|---|---|
| JP | H073748 A | 1/1995 |
| WO | WO 2006125277 | 11/2006 |

OTHER PUBLICATIONS

PCT International Search Report and Written Opinion Received from Korean Intellectual Property Office for PCT PCT/US16/33491; Received and Printed Sep. 1, 2016.

*Primary Examiner* — Frederick L Lagman
(74) *Attorney, Agent, or Firm* — Neustel Law Offices, LTD

(57) ABSTRACT

A marine fender system for absorbing energy to prevent damage to berthing facilities, berthing structures, and vessels during the berthing of the vessels. The marine fender system generally includes a plurality of mounts which are secured against a berthing structure such as a dock or the like. Each of the mounts comprises a first angled edge and a second angled edge. A frame is suspended from the berthing structure, including fenders extending from the frame toward the berthing structure. Each of the fenders comprises a first arm and a second arm extending diagonally outward in different directions from a deflector. The deflector rests against the angled edges such that pressure exerted on a bumper on the outer end of the frame will cause the deflectors to move with respect to the angled edges of the mount, thus absorbing energy which otherwise would be transferred directly to the berthing structure.

17 Claims, 14 Drawing Sheets

(56) References Cited

U.S. PATENT DOCUMENTS

| | | | |
|---|---|---|---|
| 3,933,111 A | | 1/1976 | von Bose |
| 4,854,258 A | * | 8/1989 | Hausmann ........... B65G 69/001 114/219 |
| 5,174,221 A | * | 12/1992 | Enami ...................... E02B 3/26 114/219 |
| 5,361,715 A | | 11/1994 | Kiedaisch |
| 6,106,190 A | * | 8/2000 | Nakamura ................ E02B 3/26 114/219 |
| 2002/0187009 A1 | | 12/2002 | Kiedaisch |
| 2015/0292173 A1 | * | 10/2015 | Smith ...................... B23P 6/00 405/215 |

* cited by examiner

MARINE FENDER SYSTEM

CROSS REFERENCE TO RELATED APPLICATIONS

I hereby claim benefit under Title 35, United States Code, Section 119(e) of U.S. provisional patent application Ser. No. 62/164,861 filed May 21, 2015. The 62/164,861 application is hereby incorporated by reference into this application.

STATEMENT REGARDING FEDERALLY SPONSORED RESEARCH OR DEVELOPMENT

Not applicable to this application.

BACKGROUND

Field

Example embodiments in general relate to a marine fender system for absorbing energy to prevent damage to berthing facilities, berthing structures, and vessels during the berthing of the vessels.

Related Art

Any discussion of the related art throughout the specification should in no way be considered as an admission that such related art is widely known or forms part of common general knowledge in the field.

Vessels of various sizes are typically berthed against various types of berthing facilities and structures when the vessel is not in use, or during loading or unloading of the vessel. In the past, vessels have been merely tied against such facilities or structures, and freely allowed to repeatedly contact the facilities or structures in response to water motion. Where berthing bumpers and the like are provided, they are typically inefficient or inadequate for preventing damage to both the facilities/structures and the berthing vessel; particularly in the case of larger vessels.

Therefore, instead of strengthening the structure of existing berthing facilities, which may be costly and not always feasible, the installation of the present invention on existing berthing facilities will enable the accommodation of vessels of substantially larger deadweight without endangering the structure, or the vessels, at a much reduced cost. Alternatively, designing new berthing installations, on which the ideas expressed herein are incorporated, will result in substantial reduction in the construction costs.

SUMMARY

An example embodiment of the present invention is directed to a marine fender system. The marine fender system includes a new type of marine fender, a mechanism, made from steel work or the like, into which are integrated rubber fenders. As a result of the proposed mechanism, the deflection of the proposed fender will be substantially larger than the deflection of the rubber fenders installed in the mechanism, resulting in reducing drastically the horizontal reaction force on the berthing structure and the berthing vessels.

An example embodiment of the present invention may comprise a plurality of mounts which are secured against a berthing structure such as a dock or the like. Each of the mounts comprises a V-shaped structure having a first angled edge and a second angled edge. A frame is suspended from the berthing structure, with the frame including fenders extending from the frame toward the berthing structure. Each of the fenders comprises a first arm and a second arm extending diagonally outward in different directions from a deflector. The deflector rests against the angled edges of the mount such that pressure exerted on a bumper on the outer end of the frame will cause the deflectors to move with respect to the angled edges of the mount, thus absorbing energy which otherwise would be transferred directly to the berthing structure to prevent damage to the berthing structure and vessel.

There has thus been outlined, rather broadly, some of the features of the marine fender system in order that the detailed description thereof may be better understood, and in order that the present contribution to the art may be better appreciated. There are additional features of the marine fender system that will be described hereinafter and that will form the subject matter of the claims appended hereto. In this respect, before explaining at least one embodiment of the marine fender system in detail, it is to be understood that the marine fender system is not limited in its application to the details of construction or to the arrangements of the components set forth in the following description or illustrated in the drawings. The marine fender system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
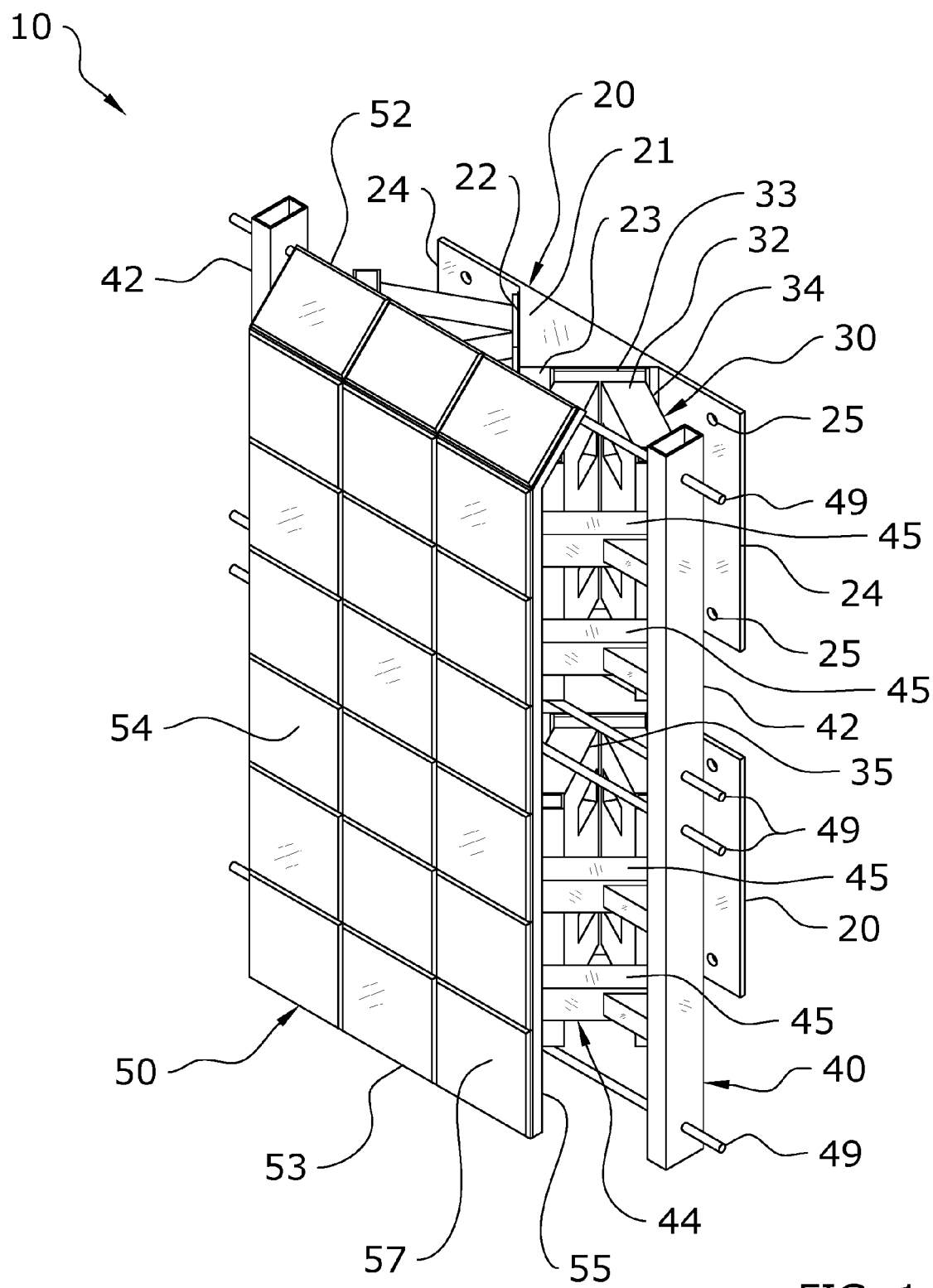
FIG. 1 is a frontal upper perspective view of a marine fender system in accordance with an example embodiment.

A. Overview.

An example marine fender system 10 generally comprises a plurality of mounts 20 which are secured against a berthing structure 14 such as a dock or the like. Each of the mounts 20 comprises a V-shaped structure having a first angled edge 22 and a second angled edge 23. A frame 40 is suspended from the berthing structure 14, with the frame 40 including fenders 30 extending from the frame 40 toward the berthing structure 14. Each of the fenders 30 comprises a first arm 34 and a second arm 35 extending diagonally outward in different directions from a deflector 33. The deflector 33 rests against the angled edges 22, 23 of the mount 20 such that pressure exerted on a bumper 50 on the outer end of the frame 40 will cause the deflectors 33 to move with respect to the angled edges 22, 23 of the mount 20, thus absorbing energy which otherwise would be transferred directly to the berthing structure 14 to prevent damage to the berthing structure 14 and vessel 12.

B. Berthing Structures/Facilities.

Exemplary embodiments of the marine fender system 10 may be installed in berthing structures 14 having a berthing deck 15, supported on sheet piles 16 or similar. While the exemplary figures show an embodiment of the present invention being utilized with a berthing facility having a berthing deck 15 and sheet piles 16, varying types of berthing structures 14 and facilities may be fitted with the present invention to prevent damage to both the berthing structures 14 and the vessel 12. By way of example, berthing structures 14 may include sea walls, docks, jetties, or any other structure to which a marine vessel 12, such as a boat, personal watercraft, or the like, may be berthed.

C. Mounts.

Figure 12:
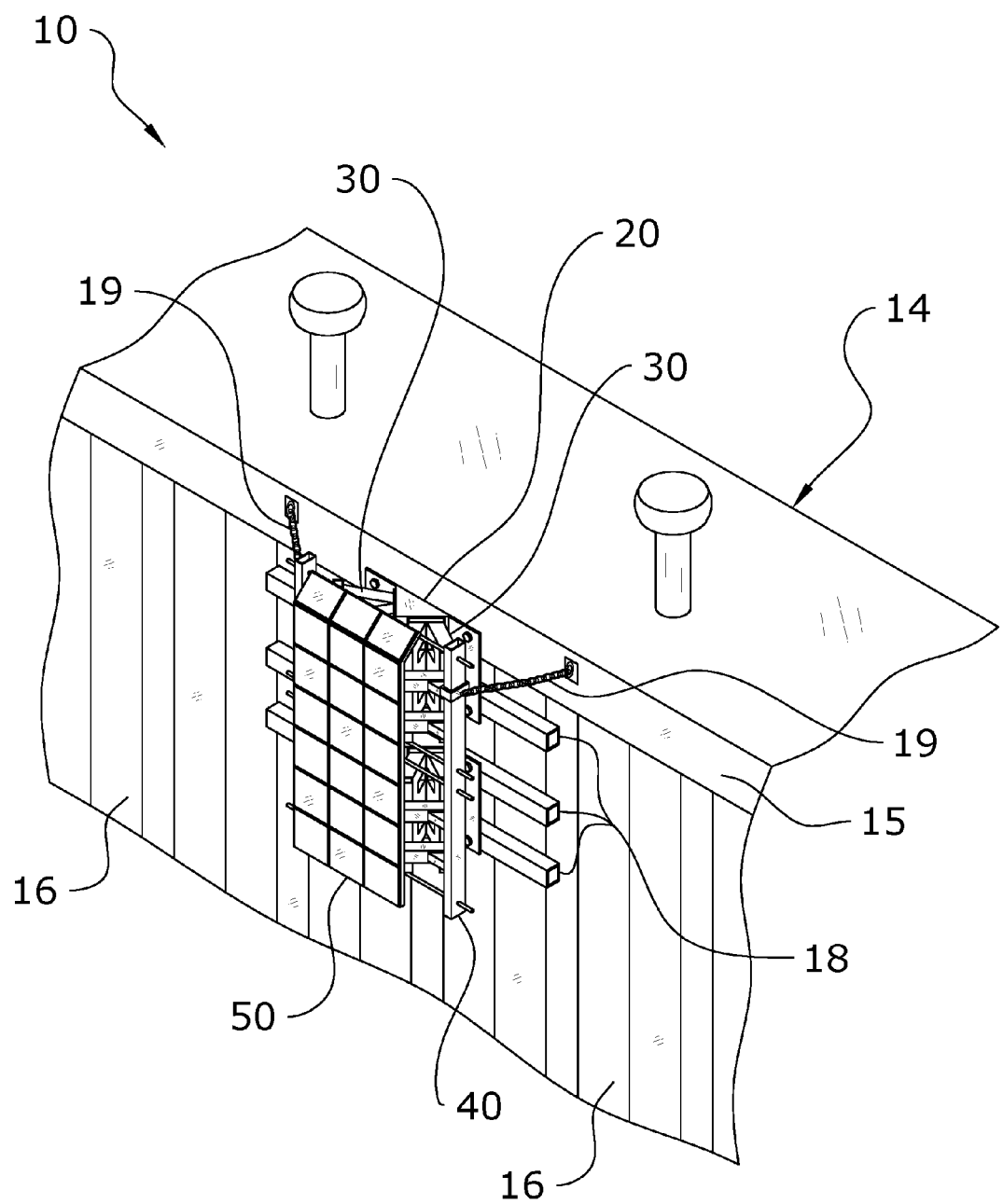
FIG. 12 is a perspective view of a marine fender system secured for use against a berthing structure in accordance with an example embodiment.
Figure 13:
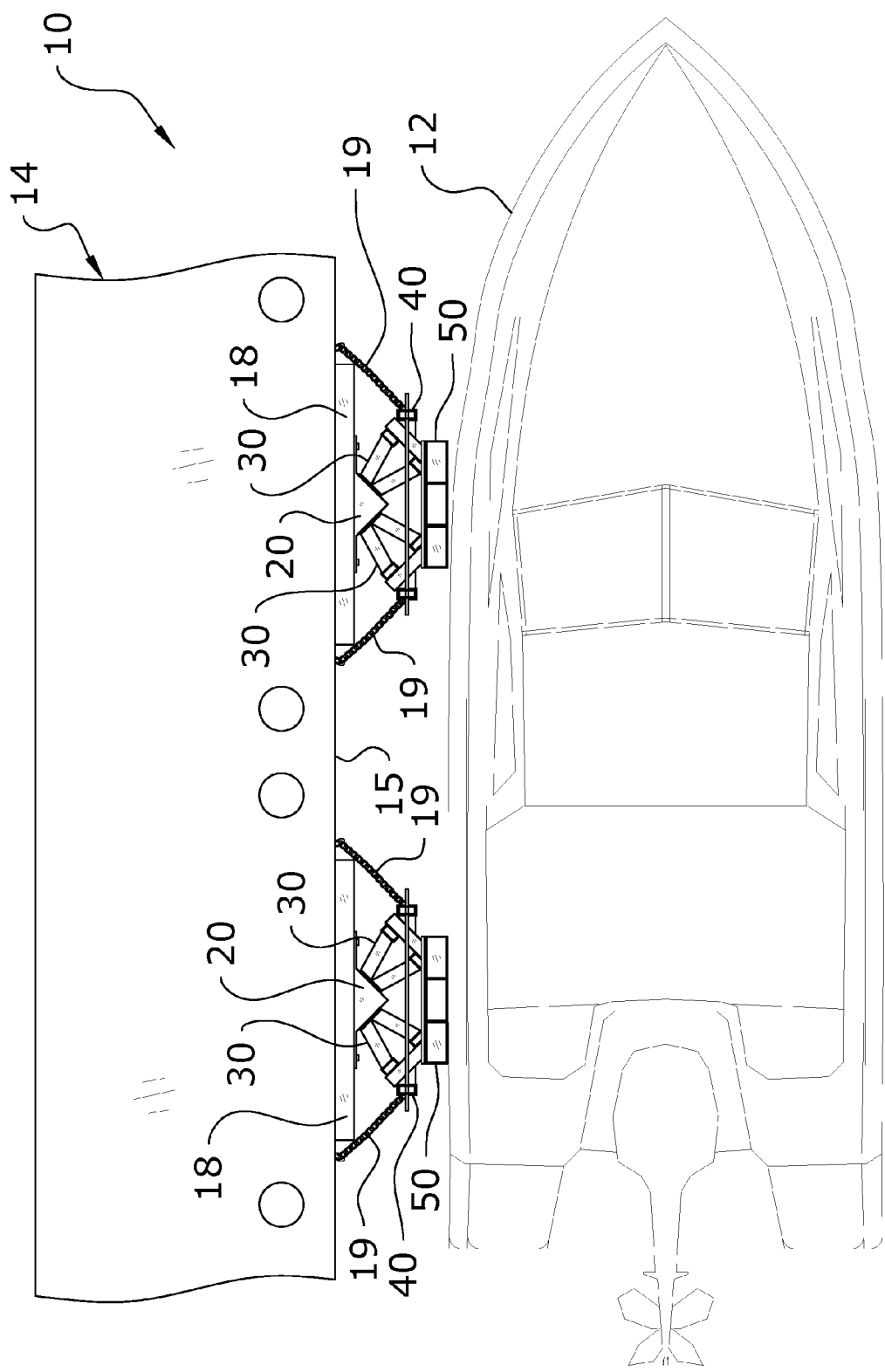
FIG. 13 is a top view of a marine fender system in use berthing a vessel in accordance with an example embodiment.

As shown throughout the figures, mounts 20 are secured against the berthing structure 14. As shown in FIG. 12, an exemplary berthing structure 14 includes a berthing deck 15 and sheet piles 16 extending downwardly into the water from the berthing deck 15. The mounts 20 may be secured on both the berthing deck 15 and the underlying sheet piles 16 by anchor bolts 28.

As shown in FIG. 12, spread beams 18 may be installed between the mounts 20 and the sheet piles 16; with the spread beams 18 being anchored to the sheet piles 16. The spread beams 18 are preferably of sufficient length to spread the pressure exerted by the berthing vessel 12 through the mounts 20 and the sheet piles 16 as required.

The shape, configuration, size, and number of mounts 20 may vary in different embodiments and to suite different types of berthing structures 14 and vessels 12. In cases of large vessels or areas with large tide fluctuations, multiple mounts 20 may be utilized, arranged horizontally and/or vertically, as shown throughout the figures.

The mounts 20 will generally comprise a first angled edge 22 and a second angled 23 forming a V-shaped projection 21 which extends outwardly form the berthing structure 14 to which the mounts 20 are secured. The angles at which the first and second angled edges 22, 23 extend with respect to the berthing structure 14 may vary in different embodiments. Force calculations for an embodiment in which the first and second angled edges 22, 23 each extend at a 60 degree angle with respect to the berthing structure 14, thus forming an equilateral triangle, are discussed below.

Figure 11:
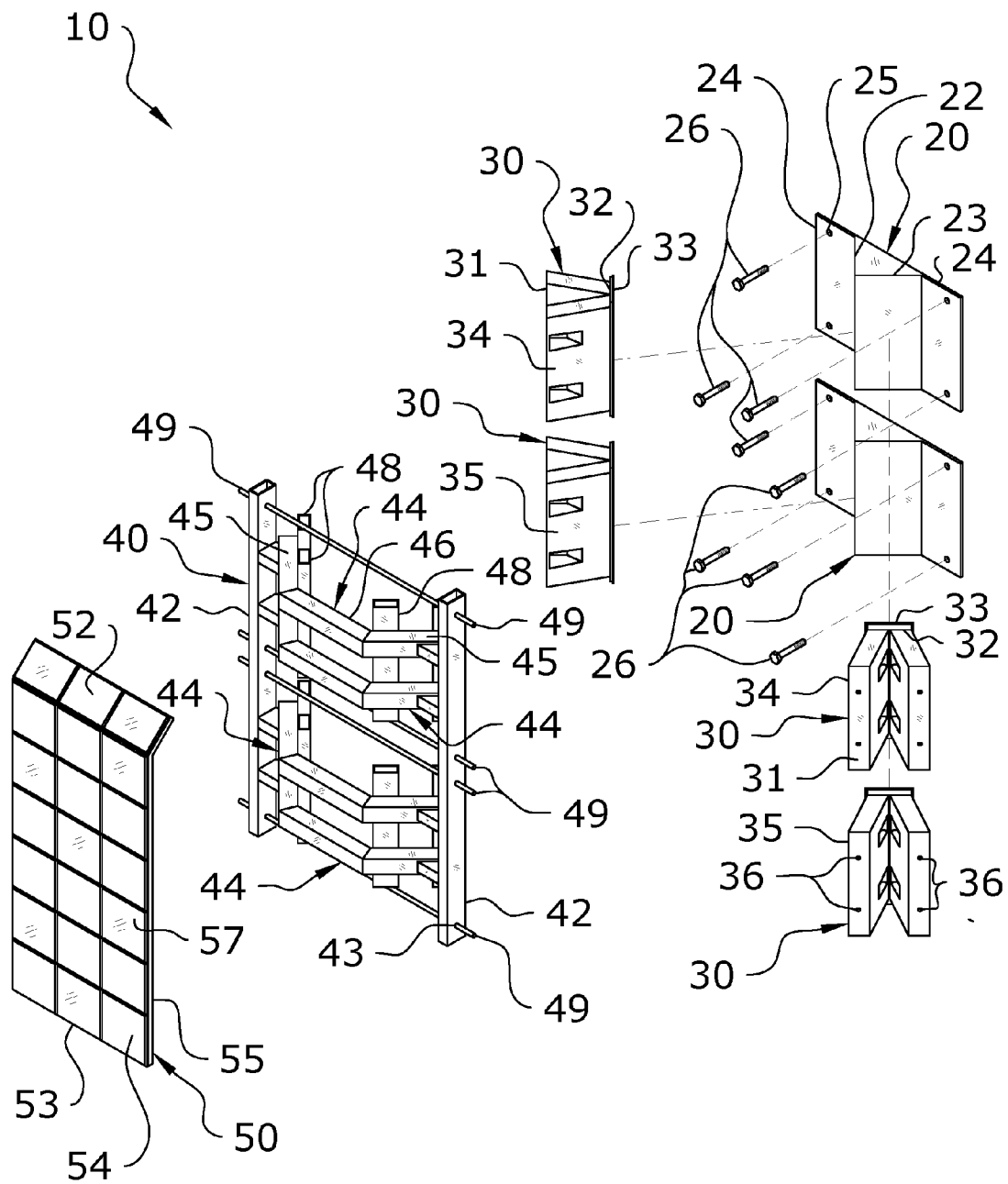
FIG. 11 is an exploded view of a marine fender system in accordance with an example embodiment.

To prevent excessive stresses on the mounts 20, stiffeners 24 may extend outwardly from the angled edges 22, 23 of the mounts 20 as shown in FIG. 11. The stiffeners 24 may comprise durable plate-like extensions which extend outwardly from each of the angled angles 22, 23 to be secured against the berthing structure 14. The stiffeners 24 may include stiffener apertures 25 through which anchor bolts 28 may extend to secure the mounts 20 to the berthing structure 14, such as shown in FIG. 11.

Figure 10:
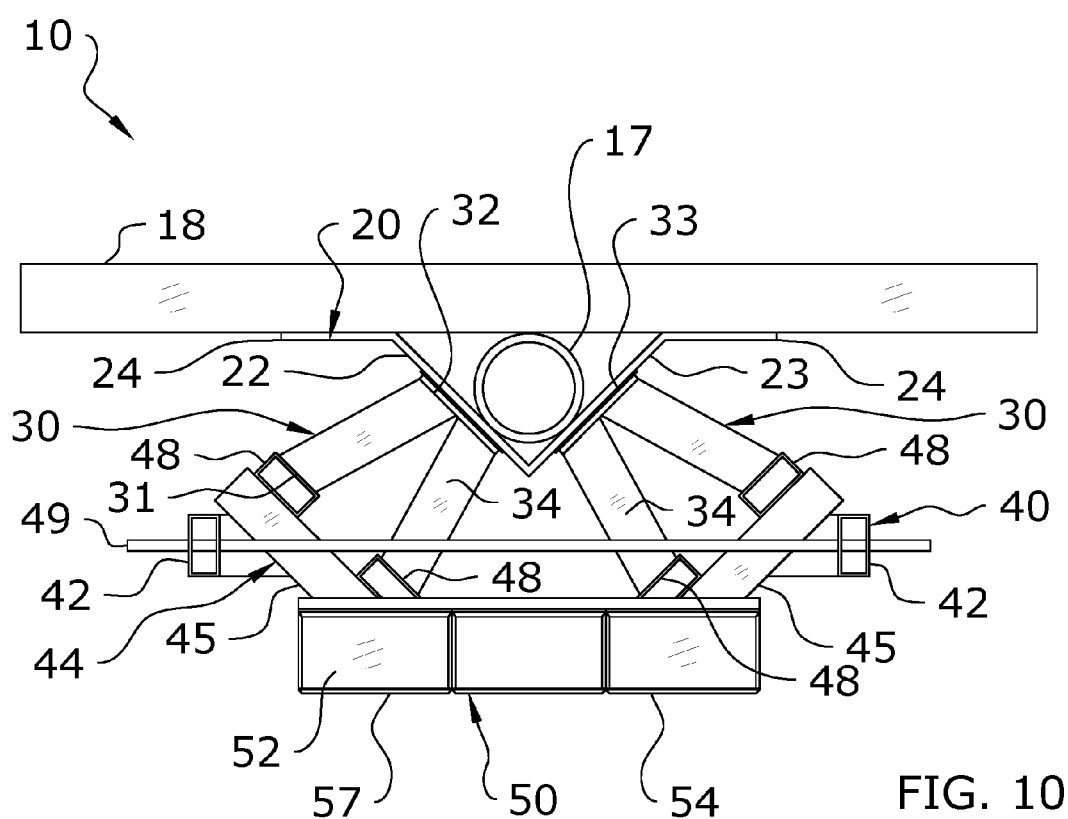
FIG. 10 is a top view of a marine fender system which incorporates a driven pile in accordance with an example embodiment.

In cases where existing sheet piles 16 are not strong enough or are not available, as in when the berthing structure 14 comprises a jetty, for example, driven piles 17 may be driven near the berthing structure 14 as shown in FIG. 10. In such cases, the mounts 20 may be welded below the berthing deck 15. If the berthing structure 14 or berthing deck 15 is supported on driven piles 17, it is possible to install the spread beams 18 between the driven piles 17, and the mounts 20 may be anchored to these spread beams 18 as shown in FIG. 10.

D. Fenders.

Figure 7:
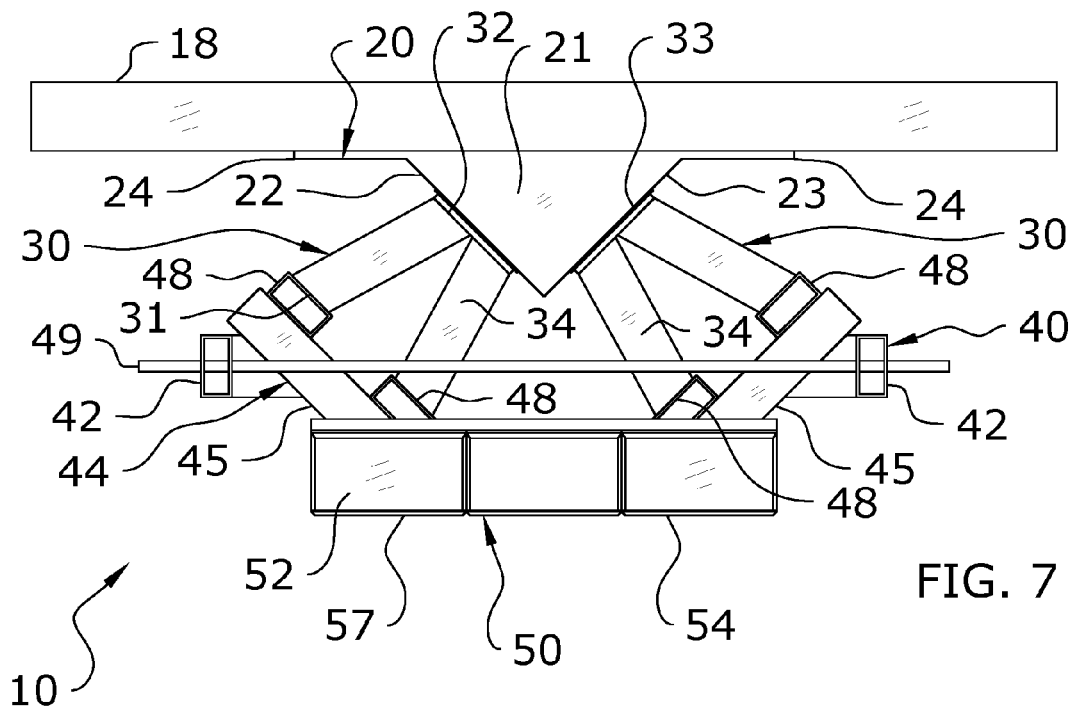
FIG. 7 is a top view of a marine fender system in accordance with an example embodiment.
Figure 8:
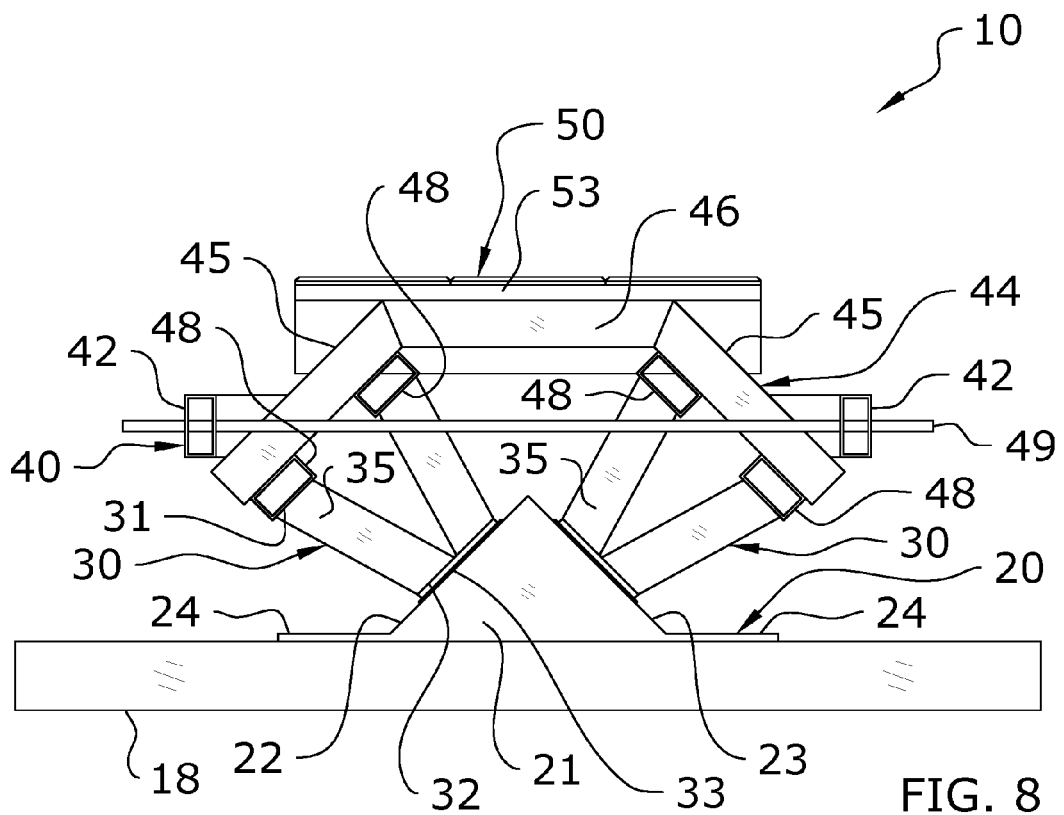
FIG. 8 is a bottom view of a marine fender system in accordance with an example embodiment.
Figure 9:
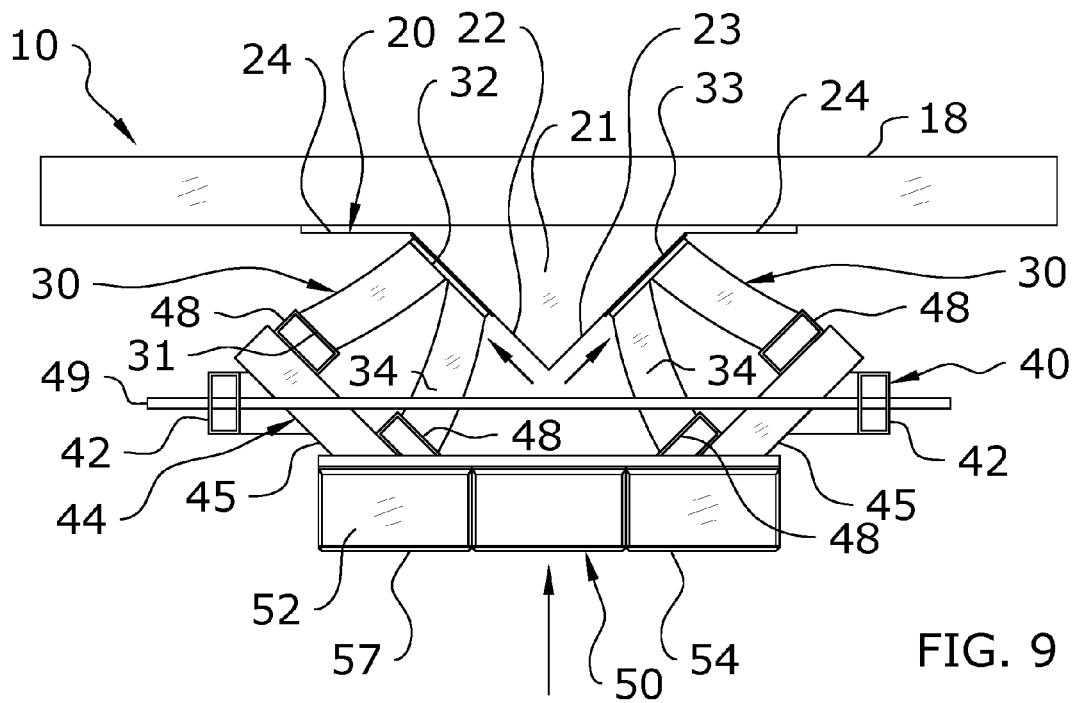
FIG. 9 is a top view of a marine fender system showing adjustment of the marine fender system in response to inward pressure in accordance with an example embodiment.

As best shown in FIGS. 5-11, fenders 30 are positioned between the frame 40 and the mounts 20. The fenders 30 are generally connected to the frame 40 and movably engaged with the mounts 20 such that the fenders 30 move (i.e., by sliding) against the mounts 20 when pressure is exerted on the bumper 50. As shown in the figures, a first end 31 of each fender 30 may be connected to the vertical support 42 of the frame 40 and a second end 32 of each fender 30 is positioned against an angled edge 22, 23 of a mount 20. The fenders 30 may slide or otherwise move along the angled edges 22, 23 of the mounts 20 as shown in FIG. 9.

The shape, structure, configuration, and number of fenders 30 may vary in different embodiments. The fenders 30 may each comprise a deflector 33 from which one or more arms 34, 35 extend angularly outwardly. The deflectors 33 are pressed against the mounts 20 in such a manner as to allow the deflectors 33 to move, such as by deflecting or sliding, with respect to the angled edges 22, 23 of the mounts 20 when pressure is exerted on the present invention. In the exemplary figures, a first arm 34 extends angularly in a first direction and a second arm 35 extends angularly in a second direction from the deflector 33 to form a V-shape.

The arms 34, 35 may comprise various materials, but preferably will comprise malleable materials capable of absorbing energy such as rubber. Similarly, the deflectors 33 may comprise various materials, but preferably will comprise durable materials such as the metallic, rigid plates shown in the figures. The deflectors 33 may be coated with an anti-friction material to improve sliding of the deflectors 33 against the mounts 20.

The fenders 30 as shown in the figures will be installed on the frame 40. For example, contact bars 48 of the frame 20, which may be welded to the cross supports 44 of the frame 40 to serve as supports to the fenders 30, are bolted or otherwise secured to the fenders 30. The fenders 30 are squeezed between the frame 40 at one end and the angled edges 22, 23 of the mounts 20 at the other. A deflector 33 is connected to every pair of arms 34, 35 and is in full contact with the angled edges 22, 23 of the mounts 20.

During berthing of vessels 12, pressure will be exerted on the frame 40, causing it to move toward the berthing structure 14, which will result in pressure exerted on the fenders 30 being distributed through the cross supports 44, causing the fenders 30 to deflect and absorb energy, while the deflectors 33 slide on the mounts 20. The contact surfaces between the mounts 20 and the deflectors 33 will preferably be of a smooth finish, such as lined with anti-friction compounds which are known in the art.

E. Frame.

As shown throughout the figures, a frame 40 may be provided to which the fenders 30 and the bumper 50 of the present invention are secured. The frame 40 may comprise various sizes, shapes, configurations, and orientations, and thus should not be construed as limited by the exemplary figures.

The frame 40 is generally positioned near the berthing structure 14, with its inner end facing toward the berthing structure 14 and its outer end facing away from the berthing structure 14. The frame 40 may be self-supported, or may be connected to the berthing structure 14 in a movable manner. In the exemplary embodiment shown in the figures, the frame 40 is suspended from the berthing structure 14 by one or more linkages 19 such as chains or the like.

In the exemplary embodiment shown in the figures, the frame 40 comprises a pair of parallel vertical supports 42 forming its first and second sides. A plurality of cross supports 44 extend between the vertical supports 42. The cross supports 44 generally extend in parallel with respect to each other and are stacked vertically between the vertical supports 42 as shown.

Figure 2:
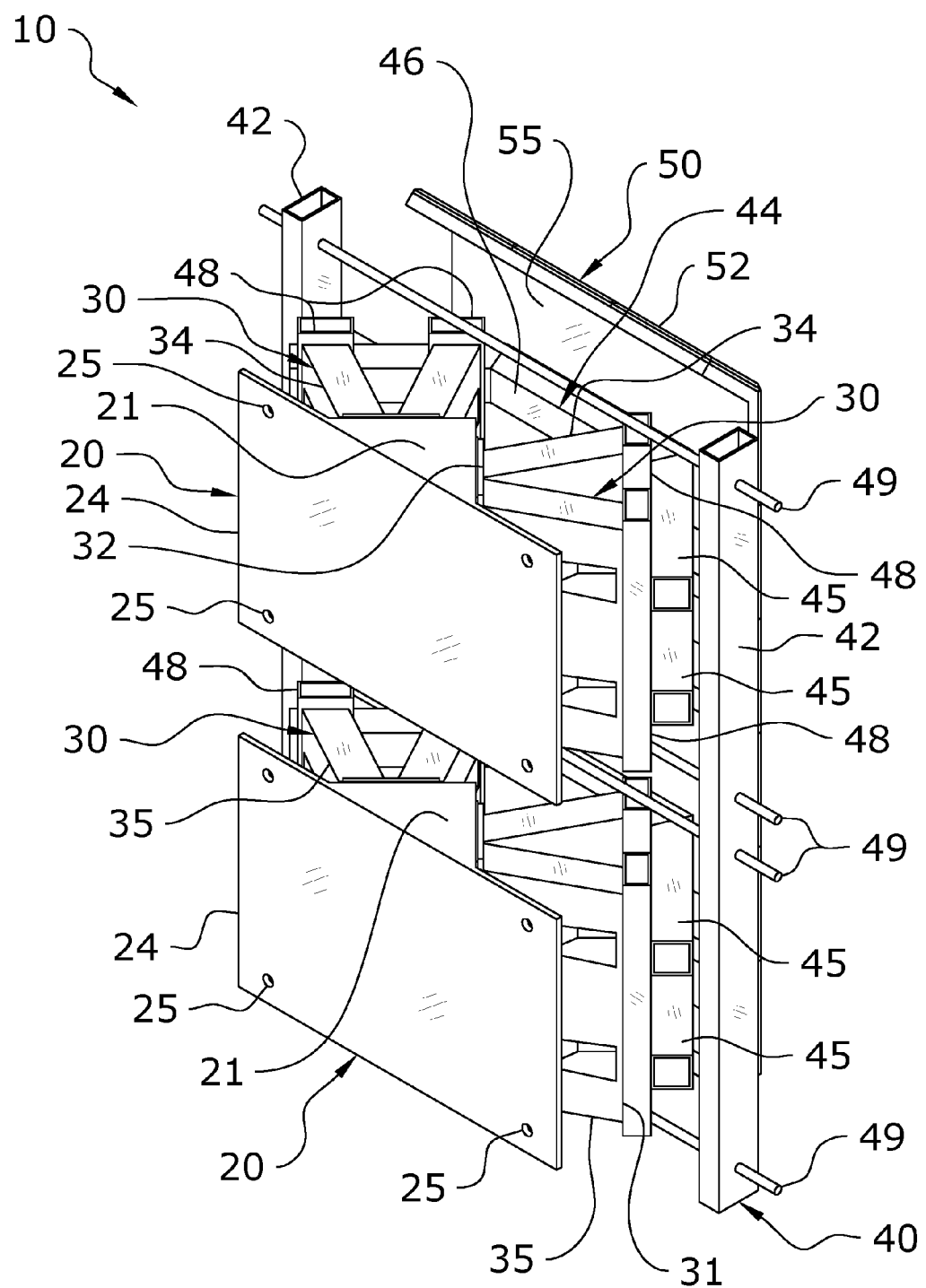
FIG. 2 is a rear upper perspective view of a marine fender system in accordance with an example embodiment.
Figure 3:
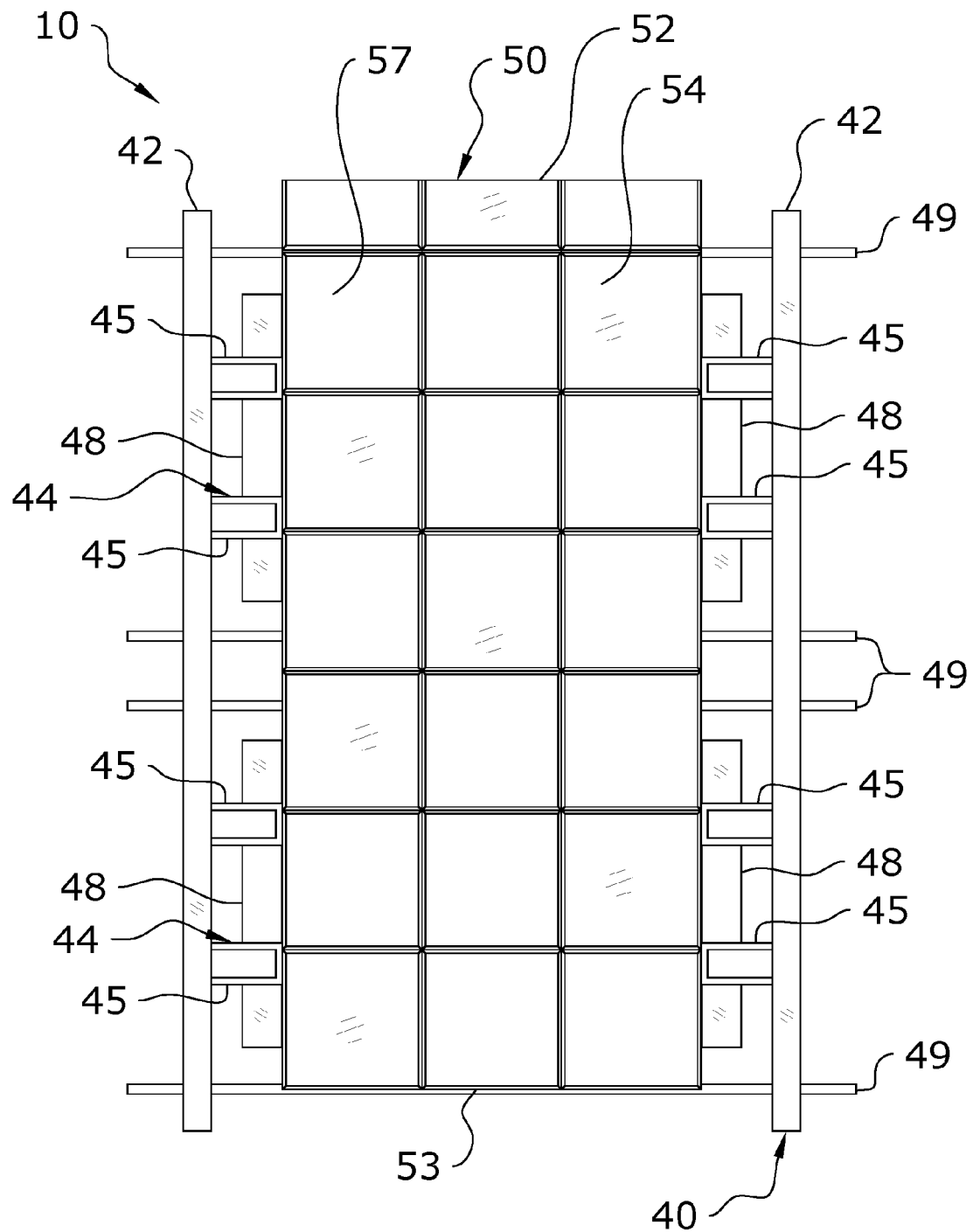
FIG. 3 is a frontal view of a marine fender system in accordance with an example embodiment.
Figure 4:
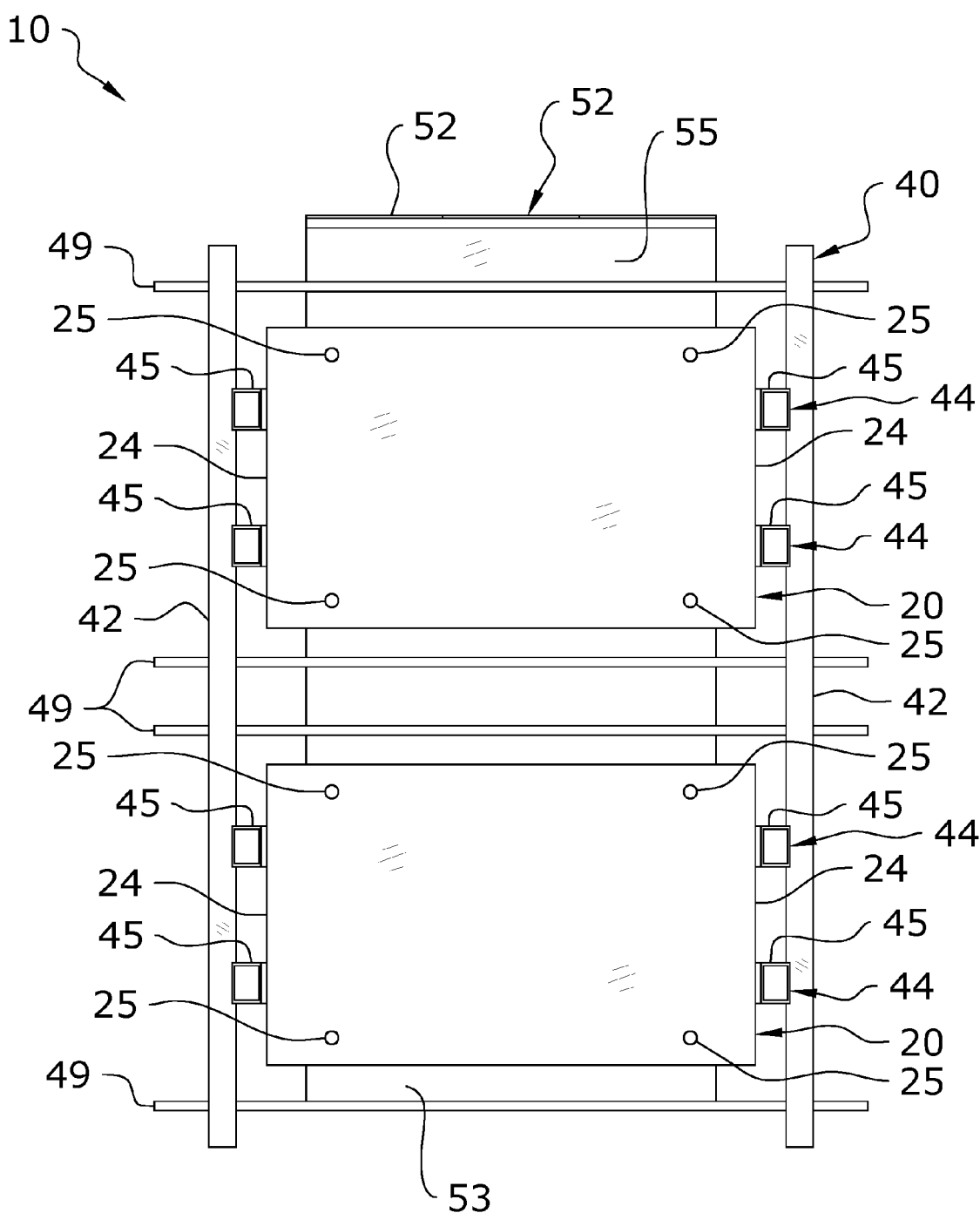
FIG. 4 is a rear view of a marine fender system in accordance with an example embodiment.
Figure 5:
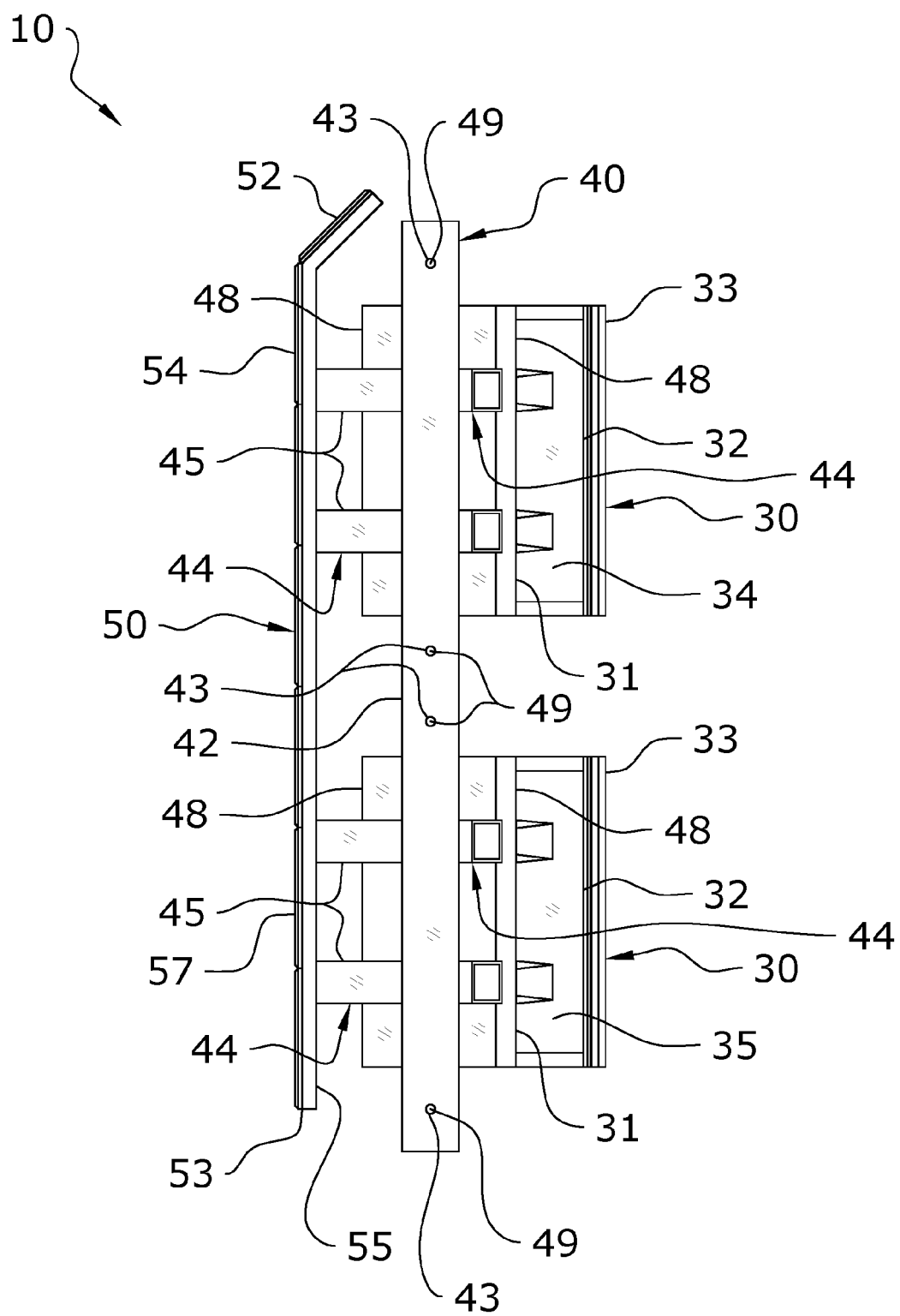
FIG. 5 is a first side view of a marine fender system in accordance with an example embodiment.
Figure 6:
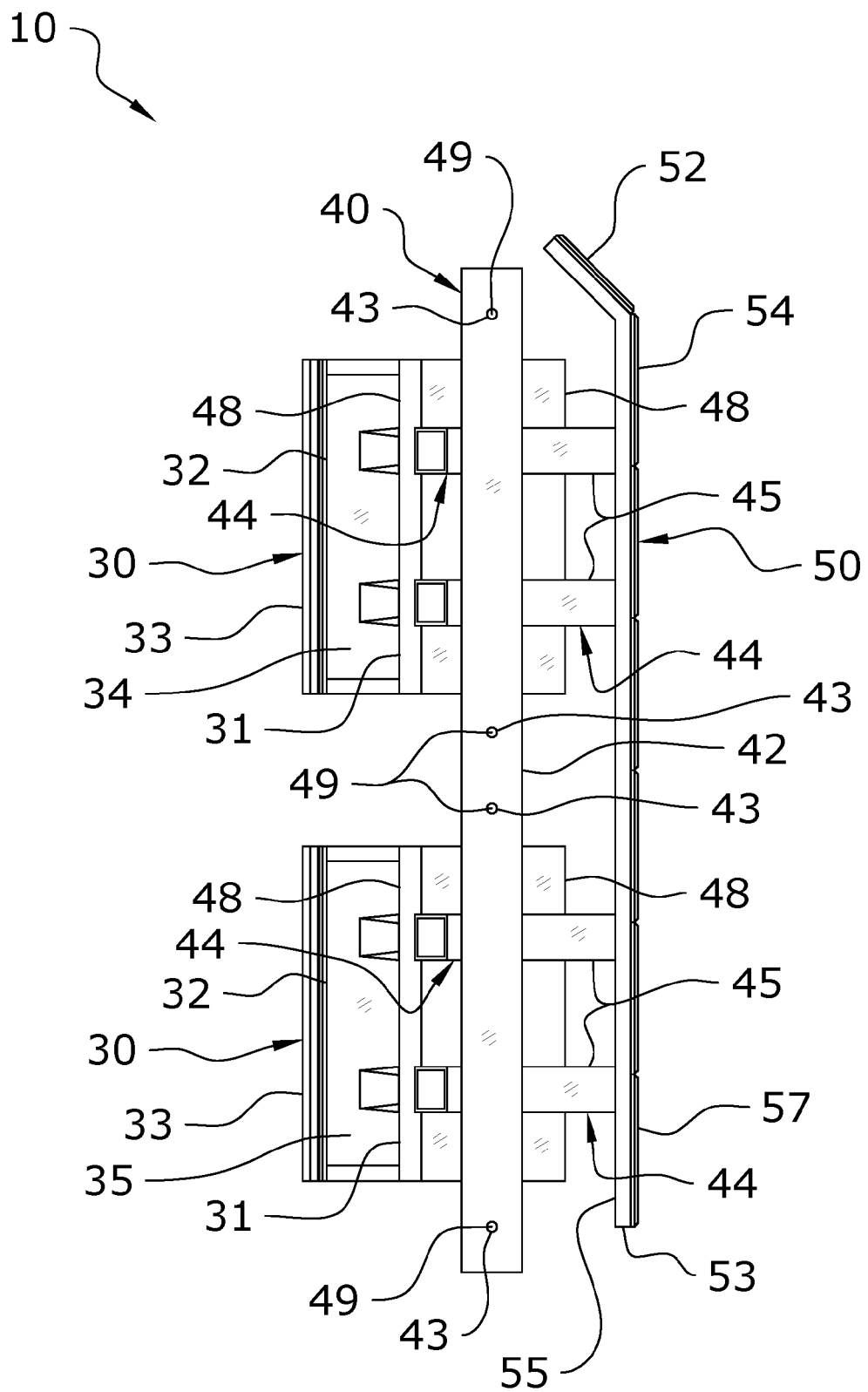
FIG. 6 is a second side view of a marine fender system in accordance with an example embodiment.

The cross supports 44 may be configured such that they partially project outwardly from the outer end of the frame 40 as shown in FIGS. 1-2. In a preferred embodiment, the cross supports 44 each comprise diagonal members 45 which extend angularly from the vertical supports 42. The diagonal members 45 may be linked together via horizontal members 46 which extend between the diagonal members 45 as shown in FIG. 11.

To reduce the dimensions of the frame 40 and cross supports 44, contact bars 48 may be connected vertically, such as by welding or fasteners, to the cross supports 44. Thus, the frame 40 may also include contact bars 48 on its inner end to which the arms 34, 35 of the fenders 30 may be connected, such as by welding or fasteners. The contact bars 48 will generally extend vertically between adjacent cross supports 44. Thus, the contact bars 48 will generally be perpendicular with respect to the cross supports 44. The contact bars 48 may be connected to only a single cross support 44, or may span across multiple cross supports 44 for added structural integrity as shown in the figures.

To avoid excessive bending moments on the cross supports 44, resulting from pressure exerted by the deflected fenders 30, tie rods 49 may be provided which tie the vertical supports 42 together at various points along the vertical supports 42. The vertical supports 42 may include apertures 43 through which the tie rods 49 may be inserted. The vertical distance between the tie rods 49 above and below the mounts 20, should be such that no contact will be formed between the tie rods 49 and the mounts 20 during deflection.

The features of the present invention which are not anchored to the berthing structure 14, including the fenders 30, frame 40, and bumper 50, which are connected together as described, are preferably suspended from and anchored to the berthing structure 14 or spread beams 18 by linkages 19 such as chains, and at the other to the frame 40 at various locations thereon. The number of linkages 19 depends on the total weight of the suspended elements.

F. Bumper.

As shown throughout the figures, on the sea side (outer side of the frame 40) a bumper 50, coming in contact with the berthing vessel 12, is lined with anti-friction material 57. The bumper 50 may be comprised of various shapes, sizes, orientations, and configurations, and thus should not be construed as limited by the exemplary figures. When the present invention is in use, the vessel 12 will contact and exert pressure on the bumper 50, with the pressure being absorbed and deflected by the frame 40 and fenders 30.

The exemplary bumper 50 shown in the figures comprises an upper end 52, a lower end 53, an outer surface 54 which contacts the vessel 12, and an inner surface 55 which is connected to, or integral with, the frame 40. The upper end 52 of the bumper 50 may be angled inwardly toward the berthing structure 14 as shown in the figures. The bumper 50 may be substantially rectangular as shown in the figures, or may be comprised of other shapes and configurations. The bumper 50 will preferably comprise a material, or be coated on its outer surface 54 with a material, which is adapted to both reduce friction and ensure that there is no damage to the vessel 12 even after repeated, forceful contact between the vessel 12 and the bumper 50.

G. Force Effects of Preferred Embodiment.

During berthing of a vessel 12, pressure will be exerted on the bumper 50, causing the bumper 50 and frame 40 to move towards the berthing deck 15. As a result, pressure will be exerted by the arms 34, 35 on the rubber fenders 30, causing these to deflect. As a result, pressure force F will be exerted on the arms 34, 35, resulting in a horizontal reaction force R on the berthing structure 14.

Figure 14A:
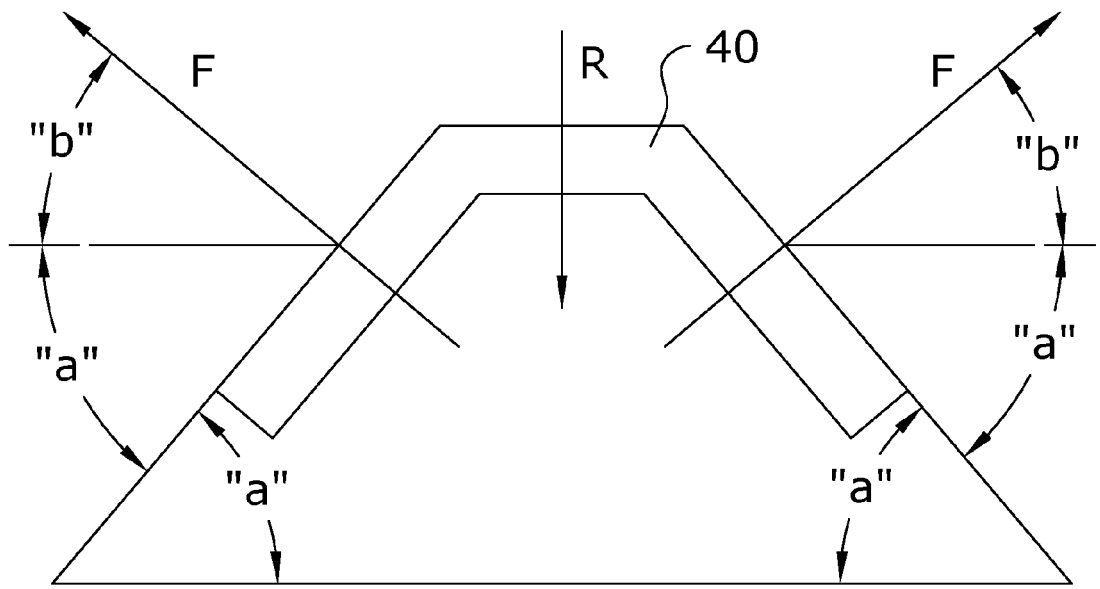
FIG. 14a is a diagram illustrating various angles and forces of the marine fender system in accordance with an example embodiment.
Figure 14B:
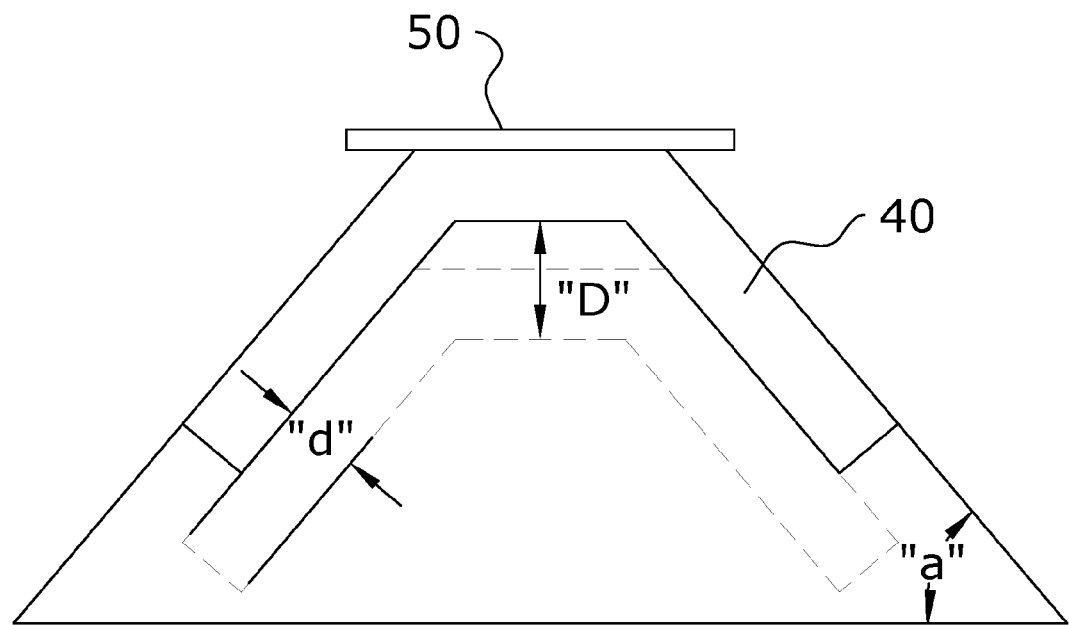
FIG. 14b is a diagram illustrating motion of the marine fender system in accordance with an example embodiment.
Figure 14C:
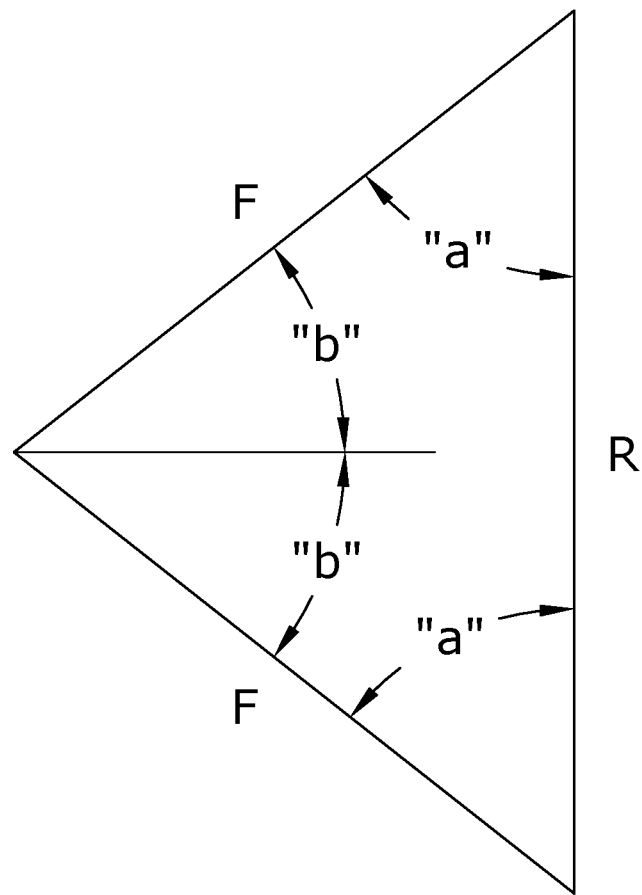
FIG. 14c is a diagram illustrating angles and forces applied to an equilateral triangle.

As shown in FIGS. 14a and 14c, the ratio between forces F and R depends on the angle a between the berthing deck 15 and inclined surfaces of plates, which are parallel to arms 34, 35. With reference to FIG. 14a, the following equation may be used:

$$R = 2F \sin b$$

If, for example, a is equal to 60 degrees, then b is equal to 30 degrees, and R will be equal to F. According to these numbers, the horizontal reaction force R on the structure will be equal to the reaction force F of the rubber fenders 30, and if energy absorbed of the rubber fenders 30 installed on arms 34, 35, at one side of the plate, is E, then the total energy absorption of the rubber fenders 30 installed on plate will be two times E. In this case, when a is equal to 60 degrees, installing the present invention will double the energy absorption while the horizontal reaction force R will not be increased.

FIG. 14b shows the ratio between the rubber deflection d and the horizontal movement D of the frame 40 including the cross supports 44. In the case where a is equal to 60 degrees, then b is equal to 30 degrees. Thus, according to the following equations:

$$D = d \sin b$$

$$D = 2d$$

the horizontal movement of the frame 40 and cross supports 44 is twice the deflection of the fenders 30.

It should be noted therefore that the distance between the cross supports 44, welded to the bumper 50 to the top edge of the mounts 20, facing seaward, as well as the distance between the cross supports 44 and the berthing structure 14 or spread beams 18, will be such that no contact will be formed by the cross supports 44 and the top edge of the mounts 20 or between the cross supports 44 and the berthing structure 14 or spread beams 18.

H. Operation of Preferred Embodiment.

In use, a plurality of mounts 20 are first secured against the berthing structure 14, such as to the berthing deck 15, sheet piles 16, driven piles 17, or spread beams 18 are connected across any of the preceding structures. The mounts 20 may be welded or connected via fasteners to the berthing structure 14. Multiple mounts 20 may be utilized, with the number, placement, and orientation of the mounts 20 being variable based upon the type of vessels 12 and berthing structure 14 being accommodated.

Generally, at least two mounts 20 are preferred for each frame 40. Notably, the mounts 20 are the only structure of the present invention which is connected directly to the berthing structure 14, with the frame 40 instead being suspended from the berthing structure 14 by the linkages 19.

With the mounts 20 in place, the frame 40 may be installed. The frame 40 is generally positioned near the mounts 20 such that the fenders 30 extending from the frame 40 contact the mounts 20. More specifically, the arms 34, 35 of the fenders 30 will contact and rest upon the angled edges 22, 23 of the mounts 20 in a manner which allows the fenders 30 to deflect and move with respect to the mounts 20 when pressure is exerted on the frame 40 through the bumper 50. In a preferred embodiment, linkages 19 such as chains will be connected between the frame 40, such as via its vertical supports 42, and the berthing structure 14, such as the berthing deck 15, so as to suspend the frame 40 from the berthing structure 14.

With the frame 40 so installed, the present invention is ready for use. A berthing vessel 12 may approach the berthing structure 14 to be berthed thereagainst. When the vessel 12 contacts the bumper 50, inward pressure from the bumper 50 will be transferred through the frame 40 to the fenders 30. Each of the fenders 30 will deflect and move with respect to the mount 20 to which the fender 30 is in contact, thus absorbing the energy as discussed in the preceding section and as shown in FIG. 9. More specifically, the arms 34, 35 of the fenders 30 will move, such as by deflecting or sliding, along the angled edges 22, 23 of the mounts 20 to absorb the energy. When the pressure is released, the arms 34, 35 will naturally revert to their original position on the angled edges 22, 23 of the mounts 20 as shown in FIGS. 7-8.

Unless otherwise defined, all technical and scientific terms used herein have the same meaning as commonly understood by one of ordinary skill in the art to which this invention belongs. Although methods and materials similar to or equivalent to those described herein can be used in the practice or testing of the marine fender system, suitable methods and materials are described above. All publications, patent applications, patents, and other references mentioned herein are incorporated by reference in their entirety to the extent allowed by applicable law and regulations. The marine fender system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A marine fender system, comprising:
    a mount adapted to be secured against a berthing structure, wherein the mount comprises a V-shaped projection including a first angled edge and a second angled edge;
    a frame positioned near the berthing structure, wherein the frame comprises an inner end and an outer end;
    a bumper on the outer end of the frame;
    a first fender between the mount and the inner end of the frame, wherein the first fender is connected to the inner end of the frame;
    a second fender between the mount and the inner end of the frame, wherein the second fender is connected to the inner end of the frame;
    wherein the first fender and the second fender are each adapted to move against the mount when pressure is exerted on the bumper, wherein the first fender is adapted to slide along the first angled edge and wherein the second fender is adapted to slide along the second angled edge.

2. The marine fender system of claim 1, wherein the first fender comprises a first deflector adapted to slide along the first angled edge and the second fender comprises a second deflector adapted to slide along the second angled edge.

3. The marine fender system of claim 2, wherein the first fender comprises a first arm extending angularly in a first direction from the first deflector and a second arm extending angularly in a second direction from the first deflector, wherein the second fender comprises a third arm extending angularly in the first direction from the second deflector and a fourth arm extending angularly in the second direction from the second deflector.

4. The marine fender system of claim 3, wherein the first arm, the second arm, the third arm, and the fourth arm each comprise a malleable material.

5. The marine fender system of claim 4, wherein the first deflector comprises a first rigid plate and the second deflector comprises a second rigid plate.

6. The marine fender system of claim 4, wherein the first deflector and the second deflector are each coated with an anti-friction material.

7. The marine fender system of claim 1, wherein the inner end of the frame comprises a plurality of contact bars.

8. The marine fender system of claim 7, wherein the first fender and the second fender are each connected to one or more of the plurality of contact bars.

9. The marine fender system of claim 1, wherein the frame is suspended from the berthing structure.

10. The marine fender system of claim 9, further comprising a chain for suspending the frame from the berthing structure.

11. The marine fender system of claim 1, further comprising a spread bar connected to the berthing structure, wherein the mount is secured to the spread bar.

12. A marine fender system, comprising:
    a mount adapted to be secured against a berthing structure, wherein the mount comprises a first angled edge and a second angled edge which together form a V-shape extending outwardly from the berthing structure;
    a frame positioned near the berthing structure, wherein the frame comprises an inner end and an outer end;
    a bumper on the outer end of the frame;
    a first fender between the mount and the inner end of the frame, wherein the first fender is connected to the inner end of the frame;
    a second fender between the mount and the inner end of the frame, wherein the second fender is connected to the inner end of the frame;
    wherein the first fender and the second fender are each adapted to move along the mount when pressure is exerted on the bumper, wherein the first fender comprises a first deflector, a first arm extending angularly in a first direction from the first deflector, and a second arm extending angularly in a second direction from the first deflector; wherein the second fender comprises a second deflector, a third arm extending angularly in the first direction from the second deflector, and a fourth arm extending angularly in the second direction from the second deflector.

13. The marine fender system of claim 12, wherein the first angled edge and the second angled edge are each at a 60 degree angle with respect to the berthing structure.

14. The marine fender system of claim 12, wherein the first deflector is adapted to slide with respect to the first angled edge and wherein the second deflector is adapted to slide with respect to the second angled edge when pressure is exerted against the bumper.

15. The marine fender system of claim 12, wherein the first arm, the second arm, the third arm, and the fourth arm each comprise rubber.

16. The marine fender system of claim 12, wherein the first deflector and second deflector each comprise a rigid plate.

17. A marine fender system, comprising:
 a mount adapted to be secured against a berthing structure, wherein the mount comprises a first angled edge and a second angled edge which together form a V-shaped structure extending outwardly from the berthing structure;
 a frame positioned near the berthing structure, wherein the frame comprises an inner end and an outer end, wherein the frame comprises a pair of vertical supports and a plurality of cross supports extending between the pair of vertical supports, wherein the cross supports each comprise diagonal members and horizontal members;
 a bumper on the outer end of the frame, wherein the bumper comprises an anti-friction material;
 a first fender between the mount and the inner end of the frame, wherein the first fender is connected to the inner end of the frame, wherein the first fender comprises a first deflector from which a first arm and a second arm extend angularly outward;
 a second fender between the mount and the inner end of the frame, wherein the second fender is connected to the inner end of the frame, wherein the second fender comprises a second deflector from which a third arm and a fourth arm extend angularly outward;
 wherein the first deflector is adapted to move along the first angled edge of the mount when pressure is exerted on the bumper, wherein the second deflector is adapted to move along the second angled edge of the mount when pressure is exerted on the bumper.

* * * * *